United States Patent Office 3,091,632
Patented May 28, 1963

3,091,632
PROCESS FOR THE PRODUCTION OF GLYCOL MONOESTERS FROM ALDEHYDES
Hugh J. Hagemeyer, Jr., and Howard N. Wright, Jr., Longview, Tex., assignors to Eastman Kodak Company, Rochester, N.Y., a corporation of New Jersey
No Drawing. Filed July 6, 1961, Ser. No. 122,104
7 Claims. (Cl. 260—476)

This invention relates to the preparation of esters and more particularly to a method of producing glycol monoesters by the condensation of an aliphatic aldehyde having one α-hydrogen atom.

The glycol monoesters produced by our novel process are of the general formula,

RR′CHCH(OH)CRR′CH$_2$O$_2$CCHRR′ wherein R and R′ are the same or different radicals selected from the group consisting of a lower alkyl, a cycloalkyl, an aryl, an alkylaryl, or an arylalkyl group.

The process of the invention employs a novel combination of reaction conditions which directs the condensation of the α-substituted aldehyde to the formation of the glycol monoesters as the principal product of the reaction. Specifically, the yield of the glycol monoester condensation product is greater than 70 percent. The process by which we obtain this valuable new result, in general, comprises contacting a dry, acid-free aliphatic aldehyde having from 4 to 10 carbon atoms and one α-hydrogen atom with an alkali metal alkoxide catalyst at a temperature in the range of 65 to 105° C., and preferably in the range of 80 to 95° C., employing a low catalyst to aldehyde ratio, i.e., in the range of 0.05 to 2.0 weight percent alkali metal alkoxide, and a relatively short reactor holdup or residence time, i.e., 0.25 to 3 hours. The preferred embodiment of the process employs specific purification and separation procedures based on azeotropic distillation to recover the glycol monoester in high purity and yield.

The reaction involved in the process of the invention can be represented by the following equation showing the condensation at the preferred temperature of three molecules of aldehyde to form the glycol monoester:

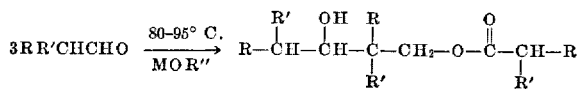

wherein R and R′ are as designated above, M is an alkali metal and R″ is a monovalent hydrocarbon radical, preferably the radical, RR′CHCH$_2$—.

The condensation of aldehydes in the presence of alkali metal alkoxide catalysts has been reported in the literature. However, the principal products have been simple esters of the type, RR′CHCO$_2$CH$_2$CHRR′, and aldol condensation products. Only rather low yields of the product of our process, the glycol monoesters, have been reported. To the best of our knowledge, the highest yield of such product is reported by Villani and Nord, J. Am. Chem. Soc., 69, 2605 (1947), who describe condensations of 2-ethylbutyraldehyde in the presence of sodium ethoxide. They report a yield of only 34.3 percent of the glycol monoester. So far as we are aware, no prior publications report a process such as we have now developed which gives the glycol monoester as the principal product of the reaction.

The feed aldehydes for our process are α-substituted aliphatic aldehydes of from 4 to 10 carbon atoms having a single α-hydrogen atom, of the formula RR′CHCHO, wherein R and R′ are lower alkyl, cycloalkyl, aryl, alkylaryl, or arylalkyl groups. By the term "aliphatic aldehydes" we thus mean to include aliphatic aldehydes having acyclic or cyclic hydrocarbon substituents. It is essential that the aldehyde starting material for our process be an aliphatic aldehyde having a single α-hydrogen atom. An aldehyde such as propionaldehyde, which has two α-hydrogen atoms is not a suitable feed because it forms a dehydratable aldol, thus releasing water which decomposes the alkoxide catalyst.

Examples of suitable aldehydes include isobutyraldehyde, 2-methylbutyraldehyde, 2-ethylbutyraldehyde, 2-methylpentanaldehyde, 2 - ethylpentanaldehyde, 2 - ethylhexanaldehyde, 2-phenylpropionaldehyde, 2-cyclohexylpropionaldehyde, and the like. The process of the invention is best adapted for producing glycol monoesters from aliphatic aldehydes of the formula, RR′CHCHO, wherein R and R′ are lower alkyl groups of 1 to 4 carbon atoms and either R or R′ is a methyl radical. Such aldehydes are the preferred feeds for the process. Of such preferred aldehydes the one with which we obtain the best results is isobutyraldehyde.

The process of the invention employs an aldehyde feed essentially free of water and acid. This permits the use of the lowest possible alkali metal alkoxide catalyst concentrations and minimizes the loss in monoester due to transesterification reactions. We prefer to operate with a water content of less than 100 parts by weight per million parts of aldehyde (hereinafter abbreviated as "p.p.m.") and for best results the water content of the aldehyde is less than 10 p.p.m. The aldehydes can be dried by azeotropic distillation, decanting the water from the overhead product of the azeotropic distillation and then distilling the dry aldehyde from the base away from any acid and feeding it directly into the condensation reactor.

The alkali metal alkoxide catalysts are made by reacting the alkali metal with dry alcohol to form a solution of the alkali metal alkoxide in alcohol. Here again the alcohol should be dry and free of acid. In general, an alkali metal alkoxide prepared from any aliphatic alcohol having from 1 to 12 carbon atoms per molecule will catalyze the reaction and produce the desired glycol monoester in high yield. However, to simplify separation we prefer to use the alcohol corresponding to the aliphatic aldehyde which is to be condensed. Thus, preferably an alcohol of the formula, RR′CHCH$_2$OH, is used to prepare an alkoxide of the formula,

RR′CHCH$_2$—O—M wherein R, R′ and M are as previously designated. Preferred alkali metals are sodium, potassium and lithium. For economic reasons we generally prefer to use the sodium alkoxides. The alkoxide catalyst can be fed to the reactor as a solution in alcohol or other suitable solvent in measured amounts and the concentration used is generally the minimum required to maintain reaction.

We have discovered that the glycol monoesters can be produced as the principal products of a condensation reaction employing alkali metal alkoxides as catalysts by carrying out the reaction at 65 to 105° C., and preferably at 80 to 95° C. In addition to controlling the reaction temperature, it is important that minimum contact times be used to lessen the formation of diols and diesters by ester interchange. The reaction can be carried out very effectively at low catalyst concentrations by carefully drying the aldehyde to be reacted. The catalyst concentration can be in the range of 0.05 to 2 weight percent alkali metal alkoxide based on the aldehyde (0.01 to 0.5 weight percent alkali metal). The preferred concentration is 0.05 to 1 percent alkali metal alkoxide. We prefer the lowest catalyst concentration that will catalyze the condensation. A higher catalyst concentration will cause higher yields of the undesired products obtained by ester interchange.

By carrying out the reaction at 80–95° C. with catalyst concentrations of the order of 0.05 to 1 percent and with contact times of one-half to one hour, yields to the glycol monoester as high as 95 percent have been realized. At temperatures above this preferred range the formation of simple ester, e.g., isobutyl isobutyrate, increases rapidly. In addition to excessive yield of the simple ester, the yield of glycol monoester is further reduced at temperatures above about 105° C. by ester interchange and the remainder of the product is generally an equilibrium mixture of diol, monoester, and diester. If the reaction is carried out at temperatures below the preferred range of 80 to 95° C. a preponderance of aldol is formed and in the reversion step the time required to reverse the aldol is long enough that again the ultimate yield to monoester is greatly reduced by ester interchange to diol and diester.

The process is carried out in a continuous manner, employing a condensation which generally consists of a vessel fitted with a reflux condenser and a mechanical stirrer or a circulating pump. The reactor is blanketed with a dry inert atmosphere such as nitrogen or methane. The reactor temperature is maintained in the desired range of 65 to 105° C. and preferably between 85 to 95° C. Other important controls are 0.05 to 2.0 percent alkoxide catalyst and a reactor holdup of 15 minutes to three hours. The reactor temperature can be controlled by the amount of external heating and cooling and/or the rate of aldehyde addition and/or the rate of catalyst addition. We prefer to set the aldehyde and catalyst feed rate to produce the desired catalyst concentration and conversion, and control the reactor temperature by external heating or cooling as required. External heating is normally required during the reaction start-up period. After initiation of the exothermic aldehyde condensation reaction, external cooling is employed to maintain the desired reaction temperature.

The crude condensation product is overflowed from the reactor into a mix tank where water is added and the condensation product is then fed to a stripping column to recover unreacted aldehyde and to reverse any aldol formed in the process. For optimum results it is usually desirable to operate this column under pressure so that base temperatures of 100–120° C. can be maintained. The organic layer is then overflowed from the column base and usually ranges from 90–95 percent of glycol monoester. In a preferred embodiment of the process, further purification of the glycol monoester is obtained by using a stripping column to remove any residual alcohol that was fed in with the catalyst and drying in the same operation. The glycol ester is then distilled at reduced pressure.

The process of our invention is further illustrated by the following examples.

EXAMPLE 1

The effect of temperature on the composition of the product formed in the condensation of aliphatic aldehydes containing a single α-hydrogen with sodium alkoxide catalysts is demonstrated in a series of runs carried out at different temperatures. In each run the feed was isobutyraldehyde and the reaction was carried out continuously changing only the temperature. The isobutyraldehyde feed contained less than 10 p.p.m. water and less than 0.01 percent isobutyric acid. The catalyst concentration in the reactor was maintained at 0.1 to 0.4 weight percent by the continuous addition of 0.5 molar sodium isobutoxide dissolved in isobutanol. The reactor holdup time was maintained at 1±0.1 hours. The condensation product was overflowed from the reactor to an aldehyde stripping column where water was fed to azeotrope out unchanged isobutyraldehyde and isobutyraldehyde recovered by the reversion of the isobutyraldol. The product was then dried and distilled. The products obtained at various temperatures are shown in Table 1.

*Table 1*

| Run No. | 1 | 2 | 3 | 4 | 5 | 6 |
| --- | --- | --- | --- | --- | --- | --- |
| Temperature, °C | 65 | 85 | 95 | 105 | 115 | 125 |
| Products, Wt. percent of Total Crude Product: | | | | | | |
| 3 - Hydroxy - 2,2,4 - trimethylpentyl isobutyrate | 71.0 | 90.0 | 70.4 | 53.0 | 30.4 | 23.6 |
| 2,2,4-Trimethyl-1,3-pentanediol | 14.0 | 2.2 | 15.2 | 20.4 | 25.8 | 14.6 |
| 2,2,4-Trimethyl-1,3-pentanediol diisobutyrate | 8.8 | 0.8 | 10.4 | 17.2 | 16.7 | 13.7 |
| Isobutyl isobutyrate | 4.8 | 3.7 | 4.0 | 7.7 | 26.2 | 46.9 |
| Isobutyraldehyde Accountability, percent | 98.6 | 96.7 | 100.0 | 98.3 | 99.0 | 98.8 |

The above table clearly shows the importance of employing a temperature below 95° C. in producing 3-hydroxy-2,2,4-triethylpentyl isobutyrate in accordance with the invention.

The next example demonstrates the recycle of unconverted aldehyde in the process of the invention.

EXAMPLE 2

Isobutyraldehyde containing less than 20 p.p.m. water and less than 0.01 percent isobutyric acid was fed into a 250-gallon circulating reactor at 1050 pounds per hour. Fresh feed averaged 620 pounds isobutyraldehyde per hour and recycle averaged 430 pounds isobutyraldehyde per hour. The catalyst concentration in the condensation reactor was maintained at 0.3 to 0.4 weight percent by the continuous addition of 6 percent sodium isobutoxide dissolved in isobutanol. The reactor temperature was maintained at 85±2° C. by external water cooling. The reactor holdup time averaged 2.4 hours. The crude reactor product was neutralized, washed and purified in a continuous system. The percent yield to condensation products, based on the weights of fresh feed plus recycle feed, is shown in the following table:

*Table 2*

| | Percent yield |
| --- | --- |
| Isobutyl isobutyrate | 3.2 |
| 2,2,4-trimethyl-1,3-pentanediol | 3.8 |
| 3-hydroxy-2,2,4-trimethylpentyl isobutyrate | 9.0 |
| 2,2,4-trimethyl-1,3-pentanediol diisobutyrate | 1.6 |
| Isobutyraldehyde accounability, percent | 99.0 |

The next two examples demonstrate the process of the invention employing different aliphatic aldehyde feeds.

EXAMPLE 3

2-methylbutyraldehyde was dried by azeotropic distillation and redistilled to produce a fraction boiling at 92–93° C. which contained 10 p.p.m. water and less than 0.01 percent 2-methylbutyric acid. The dry aldehyde was fed into a 3-liter stirred reactor at 1 liter per hour. Sodium 2-methylbutoxide in 2-methylbutanol was fed into the reactor at the rate to maintain 0.3 to 0.5 percent catalyst in the reactor. The reactor temperature was maintained at 90±5° C. and the reactor holdup was maintained at 1.5 hours. The crude reactor product was purified as in the Example 1. Yield to 3-hydroxy-2-ethyl-2,4-dimethylhexyl 2-methylbutyrate was 82.4 percent.

EXAMPLE 4

2-ethylbutyraldehyde was reacted by the method of Example 1 at 90±3° C. The yield to the glycol monoester, 3-hydroxy-2,2,4-triethylhexyl 2-ethylbutyrate, was 83.8 percent.

The following example illustrates the process of the invention with an aldehyde which contains a cyclic group.

EXAMPLE 5

Alpha-phenylpropionaldehyde (100 grams which boils at 93° at 10 mm.) was added to a stirred flask which contained 2 grams of sodium methoxide. The reaction temperature was maintained at 90–95° C. for 1 hour. The crude reactor product was washed, then distilled at reduced pressure. The yield of the desired glycol monoester, 3-hydroxy-2-methyl - 2,4 - diphenylpentyl 2-phenylpropionate, was 86 grams.

The glycol monoesters produced by the process of the invention are useful reactants for the formation of a number of important products. For instance, they can be esterified with various monocarboxylic and dicarboxylic acids in the presence of metallic esterification catalysts to yield esters useful as plasticizers, lubricants, solvents and the like.

The invention has been described in detail with particular reference to preferred embodiments thereof, but it will be understood that variations and modifications can be effected within the spirit and scope of the invention as described hereinabove and as defined in the appended claims.

We claim:

1. A process for the production of glycol monoesters of the formula,

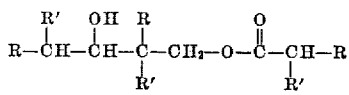

wherein R and R' are selected from the group consisting of lower alkyl, cycloalkyl and mononuclear aromatic hydrocarbon, which comprises contacting an aldehyde of the formula, RR'CHCHO, having from 4 to 10 carbon atoms with an alkali metal alkoxide catalyst, under dry, acid-free conditions, at a temperature of 65 to 105° C., at a catalyst concentration less than 2 weight percent based on the aldehyde and for a residence time less than 3 hours.

2. The process of subjecting to trimolecular condensation an aldehyde of the formula, RR'CHCHO, having from 4 to 10 carbon atoms wherein R and R' are selected from the group consisting of lower alkyl, cycloalkyl and mononuclear aromatic hydrocarbon, which comprises continuously feeding a stream of such aldehyde into a reaction zone in contact with an alkali metal alkoxide catalyst, the reaction zone being maintained at a temperature of 80 to 95° C., continuously supplying catalyst to the reaction zone at a rate to maintain a catalyst concentration of 0.05 to 1 weight percent alkali metal alkoxide based on the aldehyde feed, the aldehyde feed rate being selected to provide a residence time within the reaction zone in the range of 0.25 to 3 hours, and continuously withdrawing from the reaction zone a reaction product comprising a glycol monoester of the formula,

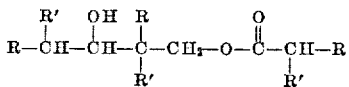

in a yield of at least 70 percent based on the aldehyde feed.

3. The process according to claim 1 in which said aldehyde is isobutyraldehyde.

4. The process according to claim 1 in which said aldehyde is 2-methylbutyraldehyde.

5. The process according to claim 1 in which said aldehyde is 2-ethylbutyraldehyde.

6. The process according to claim 1 in which said aldehyde is α-phenylpropionaldehyde.

7. The process for production of the glycol monoester, 3-hydroxy-2,2,4-trimethylpentyl isobutyrate, which comprises continuously feeding a stream of isobutyraldehyde to a reaction zone in contact with sodium isobutoxide catalyst under dry, acid-free conditions, said reaction zone being maintained at a temperature of 80 to 95° C., continuously feeding a solution of sodium isobutoxide in isobutanol to the reaction zone to maintain the catalyst concentration at 0.05 to 1 weight percent sodium isobutoxide based on the aldehyde feed, controlling the feed rates of aldehyde and catalyst to provide a reaction zone residence time of 0.25 to 1 hour and continuously withdrawing from the reaction zone a reaction product comprising said glycol monoester in a yield of at least 90 percent based on the aldehyde feed.

References Cited in the file of this patent

UNITED STATES PATENTS 2,403,876     Nord _____ July 9, 1946

OTHER REFERENCES

Nord et al.: J. Org. Chem., 8, 256–70 (1943).
Villani et al.: J. Am. Chem. Soc., 69, 2605–7 (1947).

UNITED STATES PATENT OFFICE
CERTIFICATE OF CORRECTION

Patent No. 3,091,632                                  May 28, 1963

Hugh J. Hagemeyer, Jr., et al.

It is hereby certified that error appears in the above numbered patent requiring correction and that the said Letters Patent should read as corrected below.

Column 4, line 42, for "9.0" read -- 90.0 --; line 44, for "accounability" read -- accountability --.

Signed and sealed this 24th day of December 1963.

(SEAL)
Attest:
ERNEST W. SWIDER
Attesting Officer

EDWIN L. REYNOLDS
Acting Commissioner of Patents